(12) United States Patent
Li et al.

(10) Patent No.: US 10,571,256 B2
(45) Date of Patent: Feb. 25, 2020

(54) THREE-DIMENSIONAL MEASUREMENT SENSOR BASED ON LINE STRUCTURED LIGHT

(71) Applicant: WUHAN WUDA ZOYON SCIENCE AND TECHNOLOGY CO., LTD, Wuhan (CN)

(72) Inventors: Qingquan Li, Wuhan (CN); Dejin Zhang, Wuhan (CN); Min Cao, Wuhan (CN); Xinlin Wang, Wuhan (CN); Hong Lin, Wuhan (CN)

(73) Assignee: WUHAN WUDA ZOYON SCIENCE AND TECHNOLOGY CO., LTD, Wuhan (CN)

( * ) Notice: Subject to any disclaimer, the term of this patent is extended or adjusted under 35 U.S.C. 154(b) by 18 days.

(21) Appl. No.: 16/098,105

(22) PCT Filed: Aug. 26, 2016

(86) PCT No.: PCT/CN2016/096911
§ 371 (c)(1),
(2) Date: Oct. 31, 2018

(87) PCT Pub. No.: WO2017/161828
PCT Pub. Date: Sep. 28, 2017

(65) Prior Publication Data
US 2019/0234728 A1    Aug. 1, 2019

(30) Foreign Application Priority Data

Mar. 22, 2016 (CN) .......................... 2016 1 0163636

(51) Int. Cl.
*G01B 11/25* (2006.01)
*G01B 11/245* (2006.01)
(Continued)

(52) U.S. Cl.
CPC ............ *G01B 11/245* (2013.01); *G01B 11/25* (2013.01); *G01S 17/89* (2013.01); *G06T 7/00* (2013.01);
(Continued)

(58) Field of Classification Search
CPC .. G06T 7/521; G06T 7/50; G06T 7/73; G06T 15/00; G01B 11/24; G01B 11/2522; G01B 11/255; G01B 11/245
(Continued)

(56) References Cited

U.S. PATENT DOCUMENTS

| 7,684,052 B2 * | 3/2010 | Suwa ................. G01B 11/2522 356/601 |
| 2010/0195114 A1 * | 8/2010 | Mitsumoto .......... G01B 11/245 356/601 |

(Continued)

FOREIGN PATENT DOCUMENTS

CN    102878928 A    1/2013

OTHER PUBLICATIONS

Dejin Zhang et al, "A New Method for Laser Rut Depth Measurement", Acta Optica Sinica, Jan. 31, 2013, p. 0112005-1-0112005-4, Figs 1-4, vol. 33, No. 1, China Academic Journal Electronic Publishing House, China.
(Continued)

*Primary Examiner* — Hoa Q Pham
(74) *Attorney, Agent, or Firm* — Platinum Intellectual Property LLP (57) ABSTRACT

A three-dimensional measurement sensor based on line structured light, comprising a sensing head and a controller. The sensing head is used for collecting section data and attitude information of its own, and matching the section data with the self attitude information. The sensing head comprises a three-dimensional camera, an attitude sensor, a
(Continued)

laser and a control sub-board, wherein the three-dimensional camera is installed at a certain angle relative to the laser, and acquires elevation and grey information about an object surface corresponding to laser rays using a triangulation principle. The attitude sensor, the three-dimensional camera and the laser are installed on the same rigid plane, and the attitude sensor reflects measurement attitude of the three-dimensional camera and the laser in real time. The controller is used for measuring and controlling the sensing head, performing data processing transmission and supporting external control. The sensor realizes synchronous measurement of a measured object with the same attitude and at the same time, and supports high speed and high precision measurement under a high dynamic environment, with the measurement precision reaching a micro grade and the frequency being above 10 KHz.

5 Claims, 6 Drawing Sheets

(51) Int. Cl.
*G01S 17/89* (2020.01)
*G06T 7/00* (2017.01)
*G06T 7/521* (2017.01)
*G06T 7/50* (2017.01)
*G06T 7/73* (2017.01)

(52) U.S. Cl.
CPC ............... *G06T 7/50* (2017.01); *G06T 7/521* (2017.01); *G06T 7/73* (2017.01)

(58) Field of Classification Search
USPC .................................................. 356/601–623
See application file for complete search history.

(56) References Cited

U.S. PATENT DOCUMENTS

2017/0249727 A1* 8/2017 Mayumi .................... G06T 7/74
2018/0180408 A1* 6/2018 Du .......................... G01B 11/25
2019/0025049 A1* 1/2019 Doge ................. G01B 11/2518

OTHER PUBLICATIONS

First Office Action by CNIPA dated Feb. 1, 2018 of the corresponding Chinese patent application.

* cited by examiner

THREE-DIMENSIONAL MEASUREMENT SENSOR BASED ON LINE STRTUCTURED LIGHT

TECHNICAL FIELD

The present disclosure relates to the field of three-dimensional measurement technology, and in particular to a three-dimensional measurement sensor based on line structured light.

BACKGROUND OF THE INVENTION

The emergence and development of a three-dimensional (3D) laser measurement technology provides a new technical means for the acquisition of spatial 3D information, and provides necessary survival conditions for the digital development of information. The 3D laser scanning measurement technology overcomes the limitations of traditional measurement technology, and uses a way of non-contact active measurement to directly acquire high-precision 3D data. It can scan any object around the clock and quickly convert real-world information into data that can be processed, greatly reducing costs, saving time and facilitating use. Typical products include Switzerland based Leica, Austria based Rigel, Canada based Optech, and America based FARO, and the like.

However, the three-dimensional data characteristics required by particular researching objects are not exactly the same, that is, special requirements will be proposed in the way in which the three-dimensional data are acquired based on different researching objects. For instance, for traditional land surveys, measuring and mapping, building modeling, mineral surveys, and the like, it will be just enough that a three-dimensional point cloud of a surface of an object is macroscopically obtain and the point cloud is utilized to perform modeling, which is characterized by a wide range and a relatively low precision requirements, allowing measurement at a fixed site, requiring the point cloud to cover the object to be studied, and there is no special requirements for the relationship between single points of the point cloud, and the measurement result thereof is typically an absolute distance from the measurement site. For a specific research such as cultural relic archaeology, pavement disease detection, tunnel measurements, foreign object debris and airport pavement disease detection, chip defect detection and the like, it requires measurement in a high dynamic environment, with an accuracy up to micron level, and a special relationship among the point cloud is required, and the measurement result is typically a relative distance to the measured object itself. Macroscopic 3D point cloud acquisition and modeling have been studied a lot at home and abroad, and a 3D laser radar measurement based on laser measurement technology has matured and been widely used. For example, Austria based RIEGL, America based FARO and China based Haida data cloud have mature products, a basic principle of which is to use a rotating prism to measure a single section and rotate a gimbal to scan the entire field of view to obtain a three-dimensional point cloud of the object. Based on the time-of-flight differential pulse measurement, a measurement accuracy reaches millimeter level, and a measurement speed reaches more than one million points per second. The prism and the gimbal may rotate synchronously during measurement, and a measurement section is a non-strict section (obtained not in the same time and space), that is, a three-dimensional point cloud of a surface of the object composed of discrete points. However, in areas such as road detection, tunnel surveying, track defect detection, and cultural relic archaeology, it is required to measure in a high-dynamic environment, and it is required to obtain a section in a strict sense at one measurement, that is, the points on the section are measured at a same attitude and at a same time. For example, for track profile detection and road rutting detection, it requires that a measurement width is at least 2000 mm or more, the measurement resolution (sampling interval for the points on the same section) reaches at least millimeter level, the distance measurement accuracy reaches at least 0.01 mm, and the measurement frequency is 10 KHz or more, i.e., 200 million points may be measured per second. Conventional 3D laser radar measurement techniques are all unable to meet such requirements of measurement. Therefore, research on three-dimensional measurement sensors based on linear scan has great social and economic value.

Internationally, at the beginning of this century, research on linear-scanning 3D measurement technology has been started, such as RANGER series of SICK company in Germany, but which is subject to sensors, and the measurement frequency and accuracy are relatively low. With the development of a new generation of 3D measuring cameras, a section extraction algorithm is integrated in the camera, and the camera outputs a point cloud in image space of a measurement section, so that the frequency is greatly improved, reaching 20 KHz or more, thereby making 3D measurement in high-dynamic environment possible. Although the three-dimensional camera realizes high-frequency extraction of three-dimensional sections, the three-dimensional camera itself cannot directly meet specific measurement requirements of a certain application in the face of different use environments. The three-dimensional camera needs to cope with an appropriate laser light source, merge attitude information according to the environment, control and acquire data synchronously, and realize high-precision conversion and calibration of object space and image space, and needs especially to process data professionally according to requirements of an application. Therefore, it has great practical significance to take a research on 3D measurement sensors integrating 3D cameras, lasers, attitude sensors and data preprocessing methods, design fast, fully automatic and high precision sensor calibration methods and tools, so as to achieve a sensor of high frequency, high precision and allowing measurement in high-dynamic environments.

SUMMARY OF THE INVENTION

An object of the present disclosure is to address the problem that an existing three-dimensional measurement sensor cannot satisfy three-dimensional measurement based on a section by providing a three-dimensional measurement sensor based on line structured light.

In order to solve the above technical problem, the present disclosure provides a three-dimensional measurement sensor based on line structured light, which comprises a sensing head and a controller. The sensing head is configured for measuring section data, acquiring self-attitude information, matching the section data with the self-attitude information and acquiring status information of the sensing head. The controller is configured for controlling the sensing head, data processing and transmission, and a support of external control instructions, involving controlling power supply to respective sensing head, triggering acquisition of the sensing head, controlling control parameters of the sensing head, verifying data of the sensing head, matching and registering the data of the sensing head, and processing the data of the sensing head with a built-in algorithm.

In some embodiments, In the process of road defect detection and tunnel measurement and detection, because a width of a measured object (perpendicular to a running direction) is large, a single sensing head cannot achieve full coverage at the same time, and multiple sensing heads are needed to work at the same time to achieve the purpose of increasing the measuring range. Therefore, in some embodiments, there are a plurality of sensing heads which are respectively connected to the controller, and respective sensing heads establish a network by way of RS485 or CAN bus.

The controller supports external control, including receiving positioning and attitude-determination information from an external system, and matching the positioning and attitude-determination information with the section data; and receiving a trigger signal from the external system and triggering the sensing head to acquire data.

The controller performs data processing and transmission, including: outputting status information regarding the operation of the respective sensing heads, and receiving a control instruction from an upper machine; outputting raw data acquired, the raw data including matched section data of the respective sensing heads and self-attitude information thereof; and outputting result data, as a result of data processed by the controller.

In some embodiments, the sensing head may comprise a three-dimensional camera (including a lens and a filter), an attitude sensor, a laser, and a control circuit sub-board.

The three-dimensional camera and the laser are mounted at a certain angle, and elevation and gray scale information of a surface of an object to be measured are acquired based on a principle of triangle measurement.

The attitude sensor, the three-dimensional camera and the laser are mounted on a same rigid plane, and the attitude sensor reflects measurement attitude of the three-dimensional camera and the laser in real time.

The control circuit sub-board includes a first power supply unit, a first control unit and an acquisition unit. The first power supply unit is configured to supply power to all devices in the sensing head; the first control unit is configured to control an operation of the three-dimensional camera and the laser; and the acquisition unit is configured to acquire data from the three-dimensional camera and the attitude sensor, as well as a trigger signal and status information, and perform data matching on the data from the three-dimensional camera and the attitude sensor, and the trigger signal.

The controller may comprise a control circuit motherboard, an embedded computer, and a storage device.

The controller may be connected to one or more sensing heads;

the control circuit motherboard may include a second power supply unit and a second control unit;

the second power supply unit is configured to supply power to devices in the controller and to the sensing head;

the second control unit is configured to receive an external trigger signal or generate a trigger signal autonomously to trigger an operation of the sensing head, and control the control parameters of the sensing head using the trigger signal, and an upper machine controls the operation of a plurality of sensors by using an external trigger signal;

the second control unit is configured to receive status information of one or more sensing heads, generate an alarm or stop the operation of the sensing head according to the status information, and feed back an operating status to the upper machine;

the embedded computer is configured to receive the section data matched by the one or more sensing heads, verify validity of the data, and use a trigger signal to match the data of a plurality of sensing heads with the positioning and attitude-determination data input externally; and the embedded computer generates and outputs result data after performing processing on raw data acquired, the processing including conversion of data in image space into data in object space, abnormal data replacement, measurement attitude correction, and target feature extraction.

Beneficial Effects:

The disclosure relates to research on a high-dynamic precision three-dimensional measurement technology based on line structured light, a high-speed and high-resolution vision sensor, a high-precision attitude sensor and using a principle of triangle measurement, which has a measurement precision on a micron level, and a frequency of 10 KHz or more. A high-dynamic precision three-dimensional measurement sensor is developed according to the disclosure, which realizes synchronous measurement of the measured object at a same attitude and at a same time, and supports high-speed and high-precision measurement in a high-dynamic environment. Meanwhile, the measurement technology can be applied to industrial production. For example, in chip defect detection, the measurement technology can be used to establish a micron-scale three-dimensional model of the chip, and realize automatic detection of fine defects of the chip on line.

BRIEF DESCRIPTION OF THE DRAWINGS

The technical solutions of the present invention will be described in detail below with reference to the accompanying drawings and specific embodiments.

DETAILED DESCRIPTION OF THE INVENTION

Figure 1:
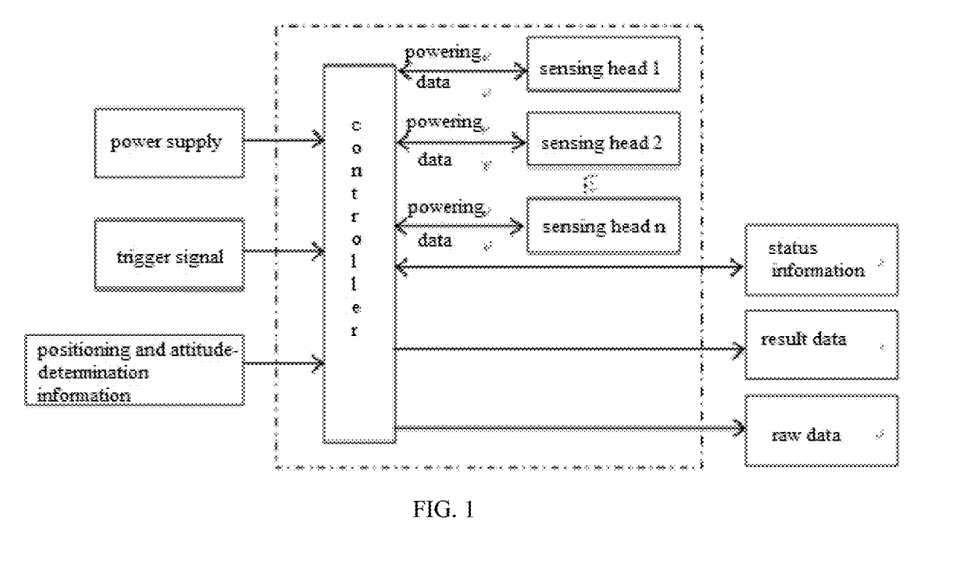
FIG. 1 is a schematic diagram of a three-dimensional measurement sensor based on line structured light according to an embodiment of the present invention.

As shown in FIG. 1, a three-dimensional measurement sensor based on line structured light comprises a sensing head and a controller. The sensing head implements measurement, and the controller implements measurement control and data processing and transmission. The sensing heads are responsible for acquiring section data and self-attitude information, and matching the two. The controller centrally controls respective sensing heads, involving controlling power supply to each sensing head, triggering acquisition of the sensing heads, controlling control parameters of the sensing heads, verifying data of the sensing heads, matching and registering the data of respective sensing heads, and processing the data of the sensing heads by using a built-in algorithm. In the process of road defect detection and tunnel measurement and detection, because a width of a measured object (perpendicular to a running direction) is large, a single sensing head cannot achieve full coverage at the same time, and multiple sensing heads are needed to work at the same time to achieve the purpose of increasing the measuring range. One controller may be connected to one or more sensing heads, and the controller may support external control.

The three-dimensional measurement sensor based on line structured light may receive positioning and attitude-determination information from an external measuring system and match it with section data; receive a trigger signal from the external measuring system to trigger the three-dimensional measurement sensor based on line structured light to acquire data, and may also acquire data at a certain frequency.

The respective sensors in the three-dimensional measurement sensor based on line structured light may establish a network by way of RS485 or CAN bus, and transmit operating states of each sensor in the three-dimensional measurement sensor based on line structured light.

The three-dimensional measurement sensor based on line structured light may output operating status information thereof, and receives control instruction from an upper machine; and may also output raw data acquired by the three-dimensional measurement sensor based on line structured light, and the raw data includes the section data and the attitude data of the respective sensing heads after being matched; an output result data may be the data after being processed by an algorithm built into the controller. According to different measurement requirements, different algorithms can be built in to obtain different result data.

Figure 2:
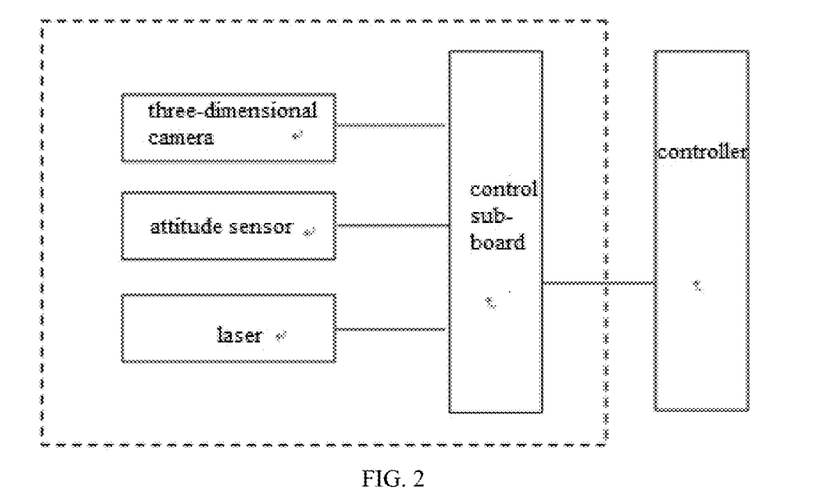
FIG. 2 is a functional block diagram showing a configuration of a sensing head according to an embodiment of the present invention.

As shown in FIG. 2, a sensing head of the three-dimensional measurement sensor based on the line structured light may comprise a three-dimensional camera (including a lens and a filter), an attitude sensor, a laser, and a control circuit sub-board. The three-dimensional camera may be mounted at an angle with the laser, and obtain elevation and gray scale information of an object surface corresponding to laser lines based on a principle of triangle measurement.

The attitude sensor, the three-dimensional camera and the laser may be mounted on a same rigid plane, and the attitude sensor may reflect measurement attitude of the three-dimensional camera and the laser in real time.

The control circuit sub-board may include a first power supply unit, a first control unit, and an acquisition unit. The first power supply unit supplies power to all devices in the sensing head; the first control unit controls an operation of the three-dimensional camera and the laser; the acquisition unit may acquire data from the three-dimensional camera and the attitude sensor, as well as trigger signals and status information, and performs data matching on the data from the three-dimensional camera and the attitude sensor, and the trigger signals.

Figure 3:
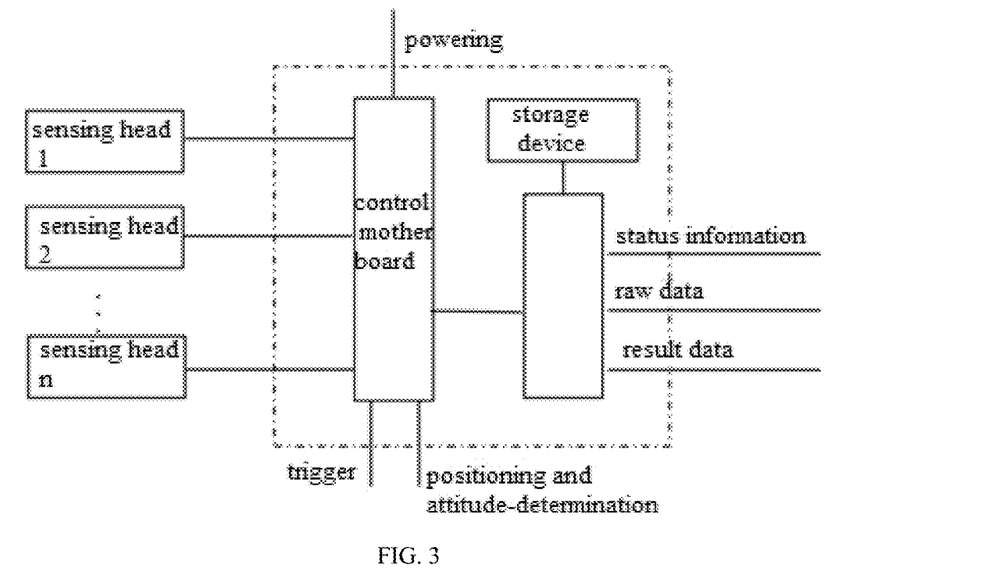
FIG. 3 is a functional block diagram showing a configuration of a controller according to an embodiment of the present invention.

As shown in FIG. 3, the controller may comprise a control circuit motherboard, an embedded computer, and a storage device.

The controller may be connected to one or more sensing heads.

The control circuit motherboard may include a second power supply unit and a second control unit.

The second power supply unit may be configured to supply power to devices in the controller as well as the sensing heads.

The second control unit may be configured to receive an external trigger signal or generate a trigger signal autonomously, so as to trigger the operation of the sensing heads, and control the control parameters of the sensing heads by using the trigger signal, and an upper machine may control the operation of a plurality of sensors by using an external trigger signal.

The second control unit may be configured to receive status information of one or more sensing heads, generate an alarm or stop the operation of the sensing heads according to the status information, and feed back operating status to the upper machine.

The embedded computer may be configured to receive section data matched by one or more sensing heads, verify a validity of the data, and match data of the plurality of sensing heads with externally input positioning and attitude-determination information by using the trigger signal.

The embedded computer may generate and output result data by performing processing on acquired raw data, such as conversion from data in image space into data in object space, abnormal data replacement, measurement attitude correction, and target feature extraction.

Figure 4:
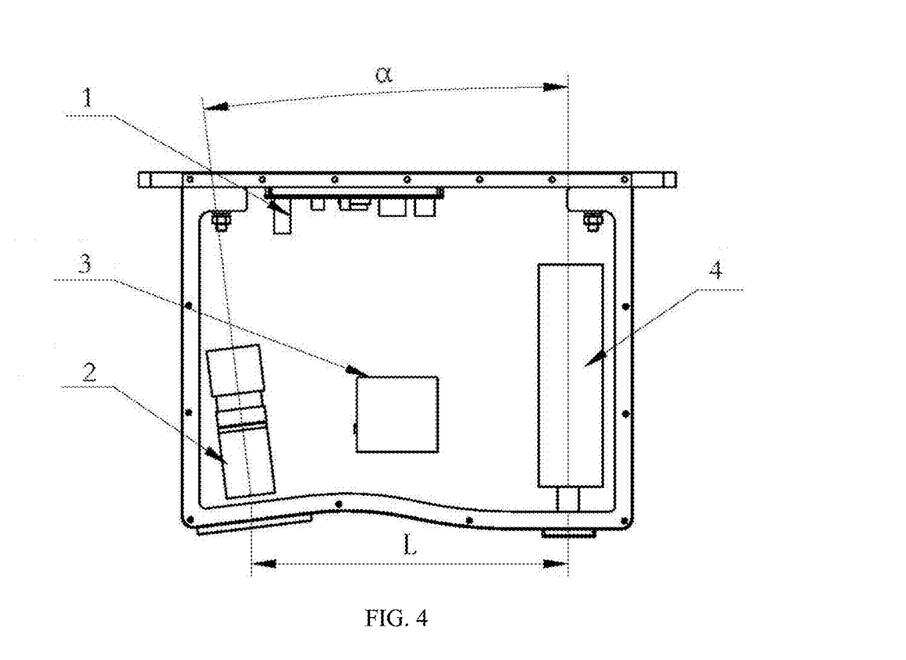
FIG. 4 is a top plan view showing a structure of a sensing head according to an embodiment of the present invention.
Figure 5:
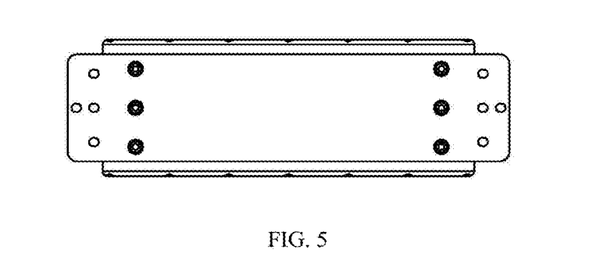
FIG. 5 is a rear view showing a structure of a sensing head according to an embodiment of the present invention.

The sensing head serves as a core part of data acquisition, and the structural applicability thereof reflects the applicability of the entire three-dimensional measurement sensor based on line structured light. The specific structure of the sensing head is shown in FIG. 4 and FIG. 5 as below.

The laser is perpendicular to a surface of an object to be measured. The three-dimensional camera and the laser form an included angle $\alpha$, which may be 4~45 degrees, and a spacing between the two is L, which may be 60~1000 mm. A working distance of the sensor may be 100~5000 mm, and a measurement range may be 20~300 mm. A measurement resolution may reach 0.0005~0.2 mm. When the working distance changes, it is necessary to adjust the included angle and spacing between the camera and the laser. For different models, the specific installation parameters are shown in Table 1 below:

TABLE 1 list of installation parameters of sensing head

| Use | Height mm | Focal length mm | Included Angle ° | Width mm | Range mm | Precision mm |
|---|---|---|---|---|---|---|
| Micro | 100 | 35 | 30 | 50 | 20 | 0.0005 |
| distance detection | 100 | 25 | 30 | 50 | 20 | 0.0007 |

TABLE 1-continued list of installation parameters of sensing head

| Use | Height mm | Focal length mm | Included Angle ° | Width mm | Range mm | Precision mm |
|---|---|---|---|---|---|---|
| Short distance detection | 500 | 35 | 28 | 182 | 100 | 0.003 |
| | 500 | 25 | 28 | 255 | 100 | 0.004 |
| Medium distance detection | 1400 | 6 | 10.5 | 3207 | 200 | 0.10 |
| | 1500 | 6 | 10 | 3431 | 223 | 0.12 |
| | 1600 | 6 | 9.5 | 3654 | 249 | 0.13 |
| | 1700 | 6 | 9 | 3877 | 278 | 0.15 |
| Medium to long distance detection | 2000 | 8 | 7.5 | 3367 | 295 | 0.15 |
| | 2150 | 12 | 7 | 3318 | 231 | 0.12 |
| | 2250 | 12 | 6.7 | 2126 | 252 | 0.13 |
| | 2350 | 12 | 6.5 | 2220 | 270 | 0.14 |
| | 2450 | 12 | 6.2 | 3775 | 295 | 0.15 |
| | 2550 | 12 | 6 | 3927 | 316 | 0.16 |
| long distance detection | 5000 | 16 | 10 | 3574 | 292 | 0.15 |
| | 5000 | 25 | 10 | 2287 | 189 | 0.10 |

Figure 6:
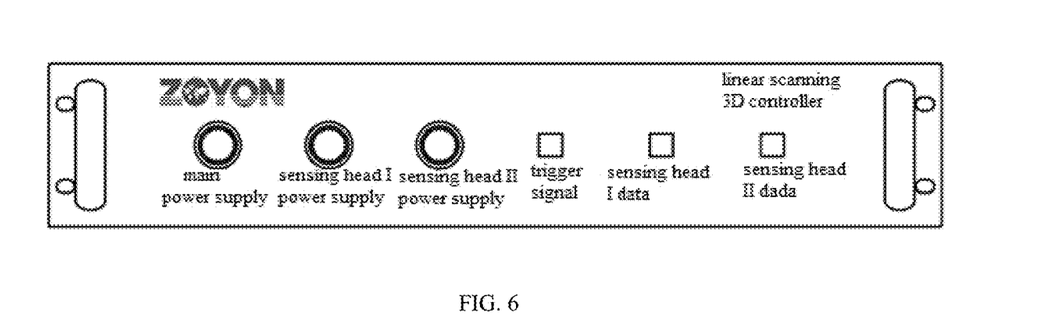
FIG. 6 is a schematic structural view of a front panel of a controller according to an embodiment of the present invention.
Figure 7:
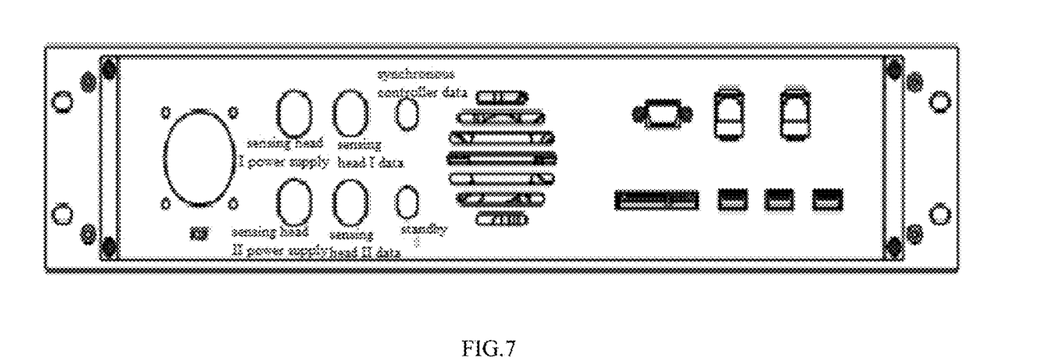
FIG. 7 is a schematic structural view of a rear panel of a controller according to an embodiment of the present invention.

The controller is a controlling core for the sensor, and a structure thereof is standardized and interfaces thereof are universalized, which also contributes to the applicability of the whole three-dimensional measurement sensor based on line structured light. The structure of the controller is shown in FIGS. 6 and 7.

Figure 8:
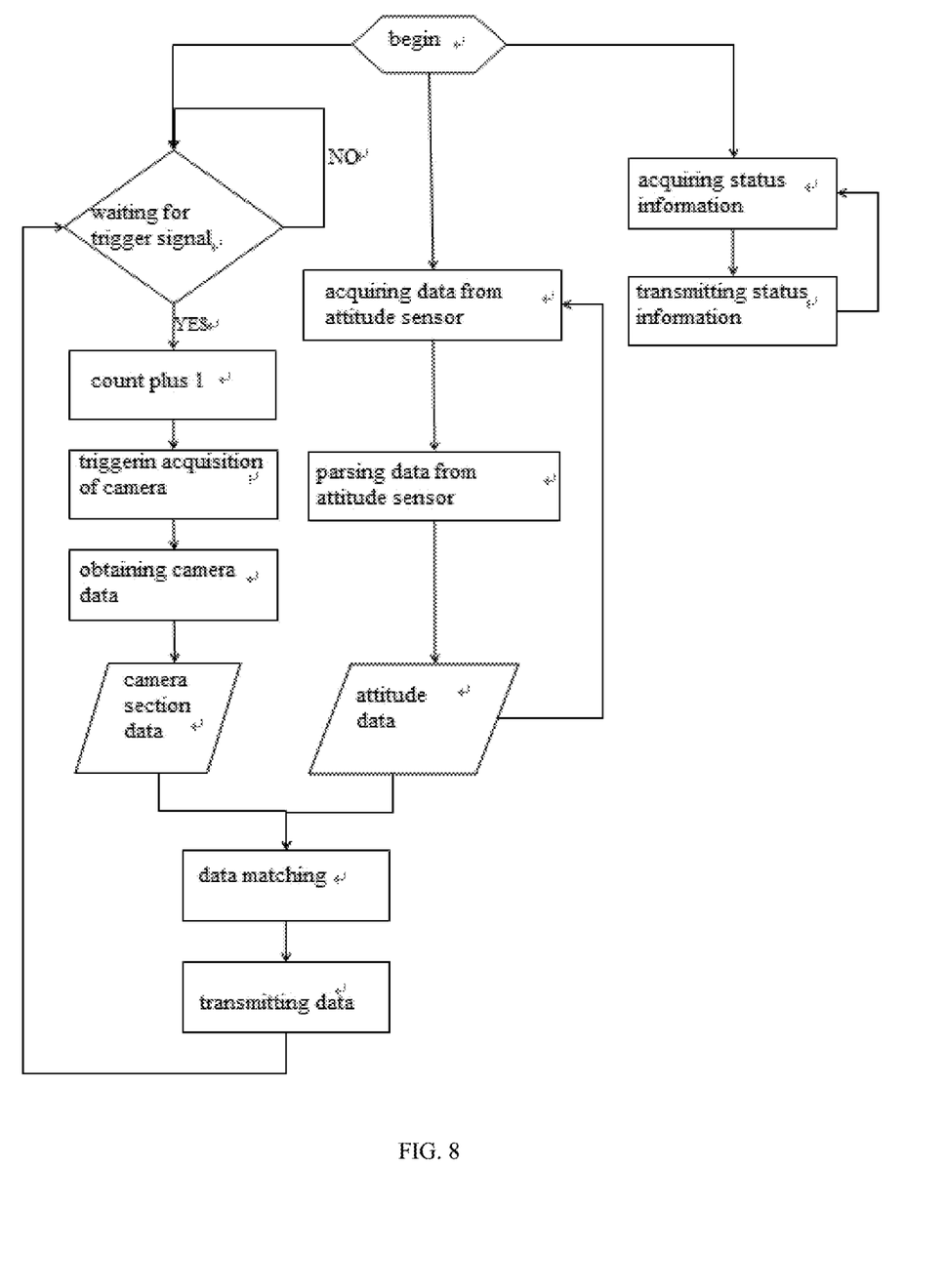
FIG. 8 is a data flow diagram showing an operation of a sensing head according to an embodiment of the present invention.

FIG. 8 shows an operating data flow chart of an energized sensing head. After being energized, the sensing head starts three tasks: attitude sensor data acquisition task, three-dimensional camera data acquisition task, and status information acquisition task.

The attitude sensor data acquisition task may include:
(1) acquiring data from the attitude sensor;
(2) parsing the data from the attitude sensor and storing it in a data buffer;
(3) repeating (1) and (2).

The 3D camera data acquisition task may include:
(1) waiting, by the control circuit sub-board, for a trigger signal; if no trigger signal, continuing to wait, otherwise, proceeding to the next step;
(2) adding 1 to a trigger signal count for later data matching;
(3) triggering a 3D camera to acquire data and waiting for the 3D camera to return data;
(4) receiving 3D camera data and storing it in a data buffer;
(5) obtaining latest attitude data from the data buffer for the attitude sensor;
(6) performing data matching on 3D camera data, attitude data, and trigger signals;
(7) repeating (1), (2), (3), (4), (5), and (6).

The status information acquisition task may include:
(1) acquiring status data;
(2) transmitting the status data;
(3) repeating (1) and (2).

Figure 9:
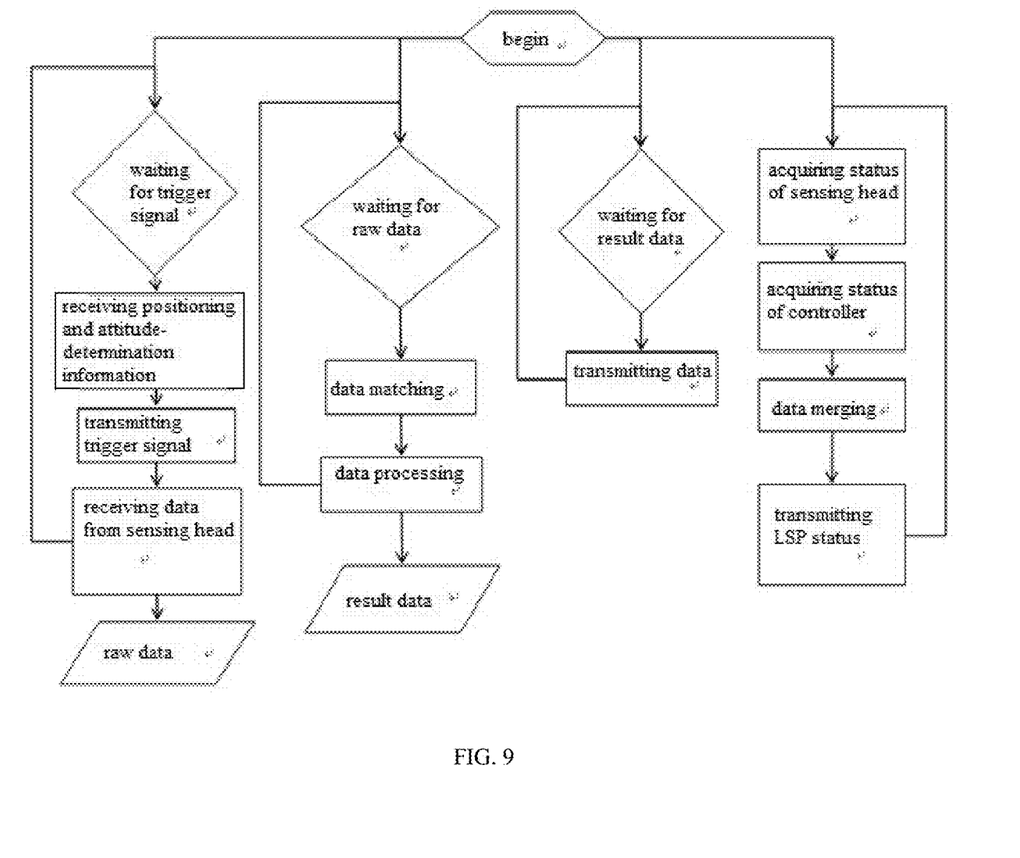
FIG. 9 is a data flow diagram showing an operation of a controller according to an embodiment of the present invention.

As shown in an operating data flow chart of the controller in FIG. 9, after the controller is energized, it starts four tasks: sensing head data acquisition task, data processing task, data transmitting task, and status information acquisition task.

The sensing head data acquisition task may include:
(1) waiting for a trigger signal input externally or a trigger signal generated by the control circuit motherboard itself;
(2) receiving positioning and attitude-determination information input externally after the trigger signal is received;
(3) transmitting a trigger signal to each sensing head to control acquisition and control parameters thereof;
(4) waiting to receive raw data of each sensing head, verifying a validity of the data, and storing the raw data and the positioning and attitude-determination information in a raw data buffer;
(5) repeating (1), (2), (3), and (4).

The data processing task may include:
(1) Waiting for the raw data, mainly detecting whether there is an update of data in the raw data buffer;
(2) Using the trigger signal to perform data matching on the raw data including the section data of each sensing head and positioning and attitude-determination information;
(3) processing the raw data by using a built-in data processing algorithm of the embedded computer to generate result data, and storing it in a result data buffer;
(4) repeating (1), (2), and (3).

The data transmission task may include:
(1) waiting for the result data, mainly detecting whether there is an update of data in the result data buffer;
(2) transmitting the result data to the upper machine;
(3) repeating (1) and (2).

Figure 10:
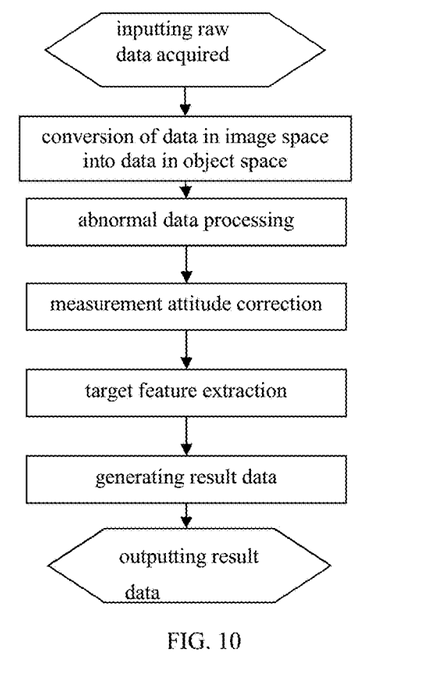
FIG. 10 is a flowchart showing a process of a built-in algorithm of a controller according to an embodiment of the present invention.

The process of data processing algorithm is shown in FIG. 10, including steps of:
(1) conversion of data in image space into data in object space. The three-dimensional measurement sensor based on line structured light may directly acquire positions of the laser lines in the image space, so it is required that a measured sectional profile in the image space is converted into a sectional profile in the object space by calibration, and the specific method of calibration may choose from several techniques in the prior art, which are common means in the art and therefore will not be described herein.
(2) Abnormal data processing. Due to changes of measurement environment, some abnormal noise points may exist in the sectional profile of the object measured by the three-dimensional measurement sensor based on line structured light. The present invention locates an area where abnormal data is in conjunction with profile features of the measured object, and replaces the abnormal data with non-abnormal data near the area where the abnormal data is.
(3) Attitude measurement correction. The measurement sensor has its own measurement attitude (including a mounting attitude and a moving attitude) during a measurement process. A measurement error caused by the measurement attitude can be corrected in conjunction with positioning and attitude-determination information, thereby obtaining a true sectional profile of the measured object.
(4) Target feature extraction. A target signal can be extracted, in conjunction with difference between a feature of a profile of the measured object and the target feature (for example, by comparing a profile of a measurement section and a standard profile to obtain a deformation information of the object).
(5) Result data generation. The extracted target signal is recorded as target signal information in a specified data format, and in turn result data are generated.

Figure 11:
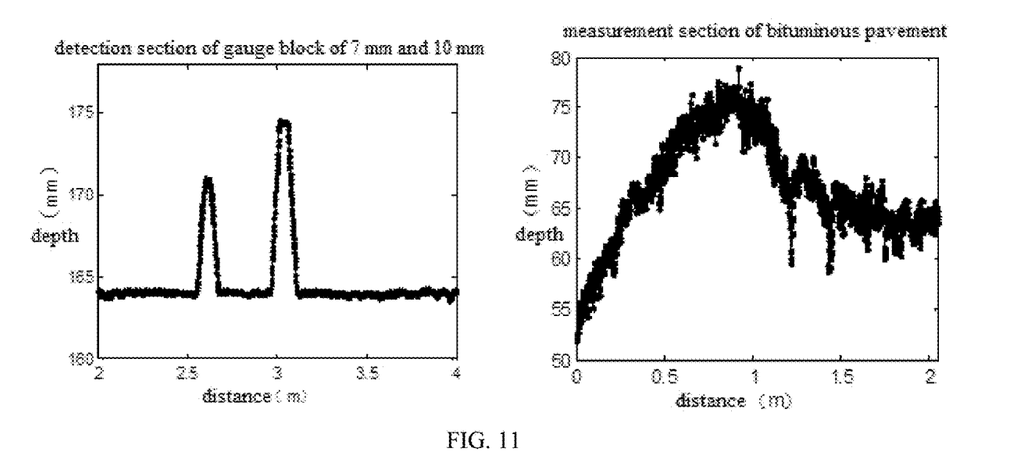
FIG. 11 is a diagram showing examples of measurement section data.

FIG. 11 shows examples of measurement section data. The left in FIG. 11 shows an example of a sectional measurement result of a 2 m planar section material on which a 7 mm high gauge block and a 10 mm high gauge block (with a width of about 5 cm~8 cm) are placed in sequence, and the right thereof shows an example of an actually measured section result of bituminous pavement.

The three-dimensional measurement sensor based on line structured light according to the disclosure can realize measurement of a measured object synchronously at a same attitude and at a same time, supporting high-speed and high-precision measurement in high-dynamic environment such as road defect detection, tunnel measurement, track defect detection and cultural relic archaeology, and a measurement accuracy may be up to micron level.

In the three-dimensional measurement sensor based on line structured light, the three-dimensional camera, the laser and the attitude sensor are integrated into the sensing head, the working distance can reach 100~5000 mm, and in this working distance, the three-dimensional measurement sensor based on line structured light can be guaranteed to have a measurement range of 20~300 mm, and a precision of 0.0005~0.2 mm.

When the sensing head acquires data, the attitude sensor can accomplish a matching of the attitude data and the section data. In a subsequent data processing process, a value of the section data can be corrected with the attitude data as desired so as to improve precision of data.

A controller can connect multiple sensing heads for data acquisition, and accomplish matching among data from multiple sensing head, thus increasing a measurement range of the three-dimensional measurement sensor based on line structured light.

The three-dimensional measurement sensor based on line structured light reduces the requirements for an upper machine. Since the controller may accomplish partial data processing tasks, an amount of data interaction with the upper machine is reduced, thereby reducing the requirements for the upper machine.

It should be noted that the above specific embodiments are only intended to illustrate the technical solutions of the present invention, and not to be construed as limiting the scope of the present invention. Although the invention are described in detail with reference to preferred embodiments, those skilled in the art should understand that the technical solutions in the disclosed embodiments can be modified or substituted in an equivalent way without departing from the spirit and scope of the invention, which are covered in the appended claims.

The invention claimed is:

1. A three-dimensional measurement sensor based on line structured light, comprising a sensing head and a controller,
   the sensing head is configured for measuring section data, acquiring self-attitude information, matching the section data with the self-attitude information and maintaining communication with the controller;
   the controller is configured for controlling the sensing head, data processing and transmission, and a support of external control instructions, involving controlling power supply to respective sensing head, triggering acquisition of the sensing head, control parameters of the sensing head, verification of data of the sensing head, matching and registration of the data of the sensing head as well as data processing;
   the sensing head comprises a three-dimensional camera, an attitude sensor, a laser and a control circuit sub-board;
   the three-dimensional camera and the laser are mounted at a certain included angle, and elevation and gray scale information of a surface of an object to be measured are acquired based on a principle of triangle measurement;
   the attitude sensor, the three-dimensional camera and the laser are mounted on a same rigid plane, and the attitude sensor feeds back measurement attitude of the three-dimensional camera and the laser in real time;
   the control circuit sub-board includes a first power supply unit, a first control unit and an acquisition unit; the first power supply unit is configured to supply power to all devices in the sensing head; the first control unit is configured to control an operation of the three-dimensional camera and the laser; and the acquisition unit is configured to acquire data from the three-dimensional camera and the attitude sensor, as well as a trigger signal and status information, and perform data matching on the data from the three-dimensional camera and the attitude sensor, and the trigger signal, and finally send matched section data and status information to the controller.

2. The three-dimensional measurement sensor based on line structured light of claim 1, wherein there are a plurality of sensing heads which are respectively connected to the controller, and respective sensing heads establish a network by way of RS485 or CAN bus.

3. The three-dimensional measurement sensor based on line structured light of claim 1, wherein the controller supports external control, including receiving positioning and attitude-determination information from an external system, and matching the positioning and attitude-determination information with the section data; and receiving a trigger signal from the external system and triggering the sensing head to acquire data.

4. The three-dimensional measurement sensor based on line structured light of claim 1, wherein the controller performs data processing and transmission, including:
   outputting status information regarding the operation of the respective sensing heads, and receiving a control instruction from an upper machine;
   outputting raw data acquired, the raw data including matched section data of the respective sensing heads and self-attitude information thereof; and
   outputting result data, as a result of data processed by the controller.

5. The three-dimensional measurement sensor based on line structured light of claim 1, wherein the controller comprises a control circuit motherboard, an embedded computer, and a storage device;
   the controller is connected to one or more sensing heads;
   the control circuit motherboard includes a second power supply unit and a second control unit;
   the second power supply unit is configured to supply power to devices in the controller and to the sensing head;
   the second control unit is configured to receive an external trigger signal or generate a trigger signal autonomously to trigger an operation of the sensing head, and control the control parameters of the sensing head using the trigger signal, and an external system controls the operation of a plurality of sensors by using an external trigger signal;
   the second control unit is configured to receive status information of one or more sensing heads, generate an alarm or stop the operation of the sensing head according to the status information, and feed back an operating status to an upper machine;
   the embedded computer is configured to receive the section data matched by the one or more sensing heads, verify validity of the data, and use a trigger signal to match the data of a plurality of sensing heads with the positioning and attitude-determination data input externally; and
   the embedded computer generates and outputs result data after performing processing on raw data acquired, the processing including conversion of data in image space into data in object space, abnormal data replacement, measurement attitude correction, and target feature extraction.

* * * * *